United States Patent [19]

Erdelitsch et al.

[11] 3,892,932
[45] July 1, 1975

[54] STEERING COLUMN SWITCH ASSEMBLY

[75] Inventors: Herbert Erdelitsch; Walter Hecht, both of Bietigheim, Germany

[73] Assignee: SWF Spezialfabrik fur Autozubehor, Germany

[22] Filed: Feb. 25, 1974

[21] Appl. No.: 445,460

[30] Foreign Application Priority Data
Feb. 17, 1973 Germany............................ 2307855

[52] U.S. Cl. ......... 200/61.27; 200/61.3; 200/61.35; 200/61.54
[51] Int. Cl............................ H01h 3/16; H01h 9/00
[58] Field of Search.................. 200/4, 61.27–61.38, 200/61.54, 293

[56] References Cited
UNITED STATES PATENTS

| | | | |
|---|---|---|---|
| 3,209,092 | 9/1965 | Vitaloni et al.................. | 200/61.34 |
| 3,530,266 | 9/1970 | Vitaloni...................... | 200/61.27 X |
| 3,796,846 | 3/1974 | Wilkinson et al................ | 200/61.27 |

*Primary Examiner*—James R. Scott
*Attorney, Agent, or Firm*—McGlew and Tuttle

[57] ABSTRACT

A switching device or unit includes a base plate which is mounted on an extension of the steering column of a motor vehicle. A first switch is mounted on the base plate and includes an actuator movable by a first lever in a first plane to selectively energize turn signal lamps and parking lamps. The operating lever is pivotally connected to the actuating member for movement in a second plane, perpendicular to the plane of movement of the actuating member, to select between the main or high beam and the dipped or low beam of the headlights, and further to flash the headlights as a courtesy signal. A second switch may be mounted in the unit above the first switch and includes a second actuating member and a second operating lever therefor, this second switch controlling the turning on and off the headlamps and the parking lamps. A stirrup-shape cover embraces the two switches and retains them on the base plate. If only the first switch is mounted in the unit, a shallower cover retains the first switch on the base plate.

14 Claims, 10 Drawing Figures

STEERING COLUMN SWITCH ASSEMBLY

FIELD AND BACKGROUND OF THE INVENTION

This invention is directed to a steering column switch device comprising a first switch operable to select between the main or high beam and the low or dipped beam of the headlamps and to flash the headlamps as a courtesy signal, by movement of a switch lever in a first plane, and operable to flash turn signal lamps and parking lamps by movement of the switch lever in a second plane perpendicular to the first plane.

Steering column switches of this type are known. Due to their position near the steering wheel, they can be reached effortlessly by the driver, a feature which is particularly important when the driver has a safety belt fastened. Numerous electrical connecting leads extend from such a steering column switch and lead, for example, to the ungrounded terminal of the battery, the ignition lock, the lamps of the vehicle lamps and a second switching device, provided on the dashboard, for switching on and off the headlamps and the sidelamps.

It is generally difficult, and therefore a disadvantage, to arrange so many connecting leads along the steering column. The connecting leads are frequently connected by means of pin or plug connectors, which often form a source of breakdown. A further disadvantage is that the second switch device on the dashboard often can be reached only with difficulty when the user is wearing a seat or safety belt.

SUMMARY OF THE INVENTION

The objective of the present invention is to provide a steering column switch device which obviates the disadvantages of known switch devices mounted on the steering column of a motor vehicle.

In accordance with the invention, there is provided a steering column mounted switch device including a self contained switch, actuated by the movement of a switch lever in a first plane, to select between the main or high beam and the low or dipped beam of the headlamps, and to flash the headlamps as a courtesy signal, and actuated by movement of the switch lever, in a second plane perpendicular to the first plane, to energize turn signal lamps and parking lamps a self contained second switch, having its own actuating member, operable to turn the headlamps and sidelamps off and on may be mounted in the unit above the first switch, the two switches thus being combined in a three-dimensional unit.

Thereby, the electrical connections, necessary between the two switches, are protected within the steering column and kept short. Furthermore, the second switch can be reached, by a driver, just as easily as can the first switch.

The second switch may have two buttons as actuating members, in the usual manner, one serving to switch on the headlamps and the other to switch on the sidelights, the two buttons being coupled mechanically so that, when the headlamps are switched on, the sidelamps are also switched on and, when the sidelamps are switched off, the headlamps are also switched off.

However, since the driver is already accustomed to switching with levers mounted on the steering column, it is preferable that the two switches be arranged one above the other, and that the actuating member of the second switch be formed as a switch lever which is shorter than the switch lever for the first switch and which extends in substantial alignment therewith.

An object of the invention is to provide an improved steering column mounted switch device for a motor vehicle.

Another object of the invention is to provide such a steering column mounted switch device including switches controlling all of the lamps of the vehicle.

A further object of the invention is to provide such a steering column switching device including a first switch operable not only as a turn signal switch but also to select between the main or high beam and the low or dipped beam of the headlamps, and to flash the headlamps as a courtesy signal, and which switching device may selectively have incorporated therein a second switch controlling turning on and off of the headlamps and side lamps.

For an understanding of the principles of the invention, reference is made to the following description of a typical embodiment thereof as illustrated in the accompanying drawings.

DESCRIPTION OF THE PREFERRED EMBODIMENT

Figure 1:
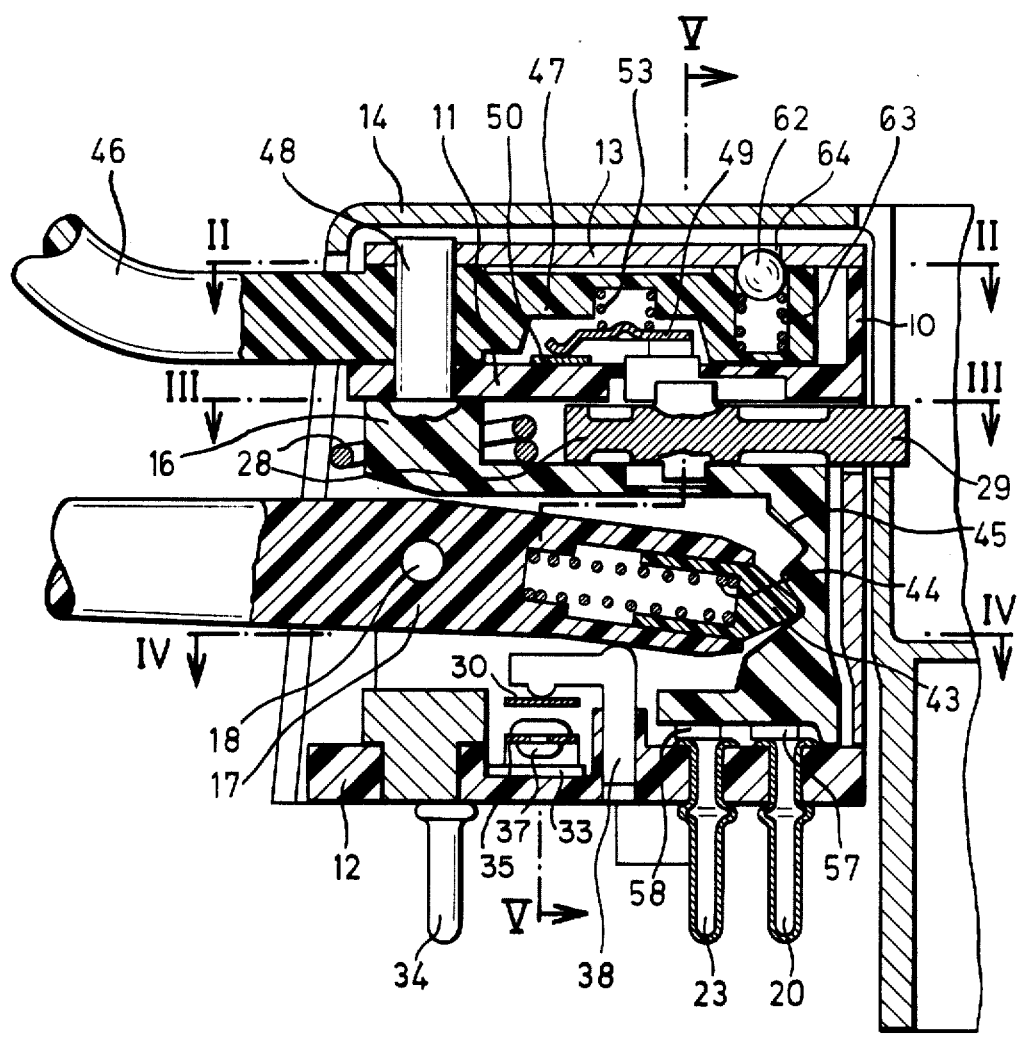
FIG. 1 is a sectional view through a steering column switch perpendicular to the plane of a base plate of the switch and in the plane of the switch lever.

Referring first to FIGS. 1 through 7, a steering column switch device embodying the invention includes a switch body 10 which, in vertical section, has a generally H-shaped cross section. Switch body 10 is formed of plastic composition material and has a lower compartment for accommodating a first switch device and an upper compartment for accommodating a second switch device, the compartments being separated by a wall 11 of switch body 10 and which forms the base of the upper compartment. The base of the lower compartment is formed by a base plate 12. Switch body 10 and base plate 12 are interconnected by a stirrup 13 embracing the switch body and simultaneously formed as a cover for switch body 10. Base plate 12 is secured in a hood-like extension 14 of the steering column casing by means of screws 15, as shown in detail in FIG. 7.

The first switch or first switch device in the lower compartment of switch body 10 includes a switch member 16 which is pivotally mounted between wall 11 and base plate 12, and which is rotatable in a plane parallel to the plane of base plate 12. A first lever 17 is pivotally mounted on switch member 16 for rotation in a plane perpendicular to the plane of base plate 12, switch lever 17 being thus rotatable or oscillatable about a pin 18. Thus, switch member 16 may be oscillated in a plane parallel to base plate 12 by appropriate movement of switch lever 17, and switch lever 17 may be oscillated, relative to switch member 16, in a plane perpendicular to base plate 12.

Switch member 16 has recesses, shown at the lower right portion of FIG. 1, on its underside facing base plate 12 for receiving and guiding two contact bridges 57 and 58 spaced at different radial distances from the pivot axis of switch member 16. Contact bridges 57 and 58 are provided for bridging counter-contacts 19-24, shown in FIG. 4, and which are simultaneously formed as contact plugs. Counter-contacts 19-21 are located along a switch path associated with contact bridge 57, while counter-contacts 22-24 are located along a switch path associated with contact bridge 58.

Counter-contacts 19-21 and contact bridge 57 are provided for energizing the flahing signal lamp circuits, while counter-contacts 22-24 and contact bridge 58 are provided for energizing the parking lamp circuits. As may be seen from FIGS. 4 and 8, in one operating position of switch member 16, counter-contacts 19 and 20 are interconnected by contact bridge 57 and counter-contacts 22 and 23 are interconnected by contact bridge 58. In the other operating position of switch member 16, counter-contacts 20 and 21 are interconnected by contact bridge 57 and counter-contacts 23 and 24 are interconnected by contact bridge 58. Contact bridges 57 and 58 do not bridge any counter-contacts when switch member 16 is in the central non-operating position. The contact bridges 57 and 58 are pressed onto the respective counter-contacts by means of helical springs which have not been shown.

Figure 3:
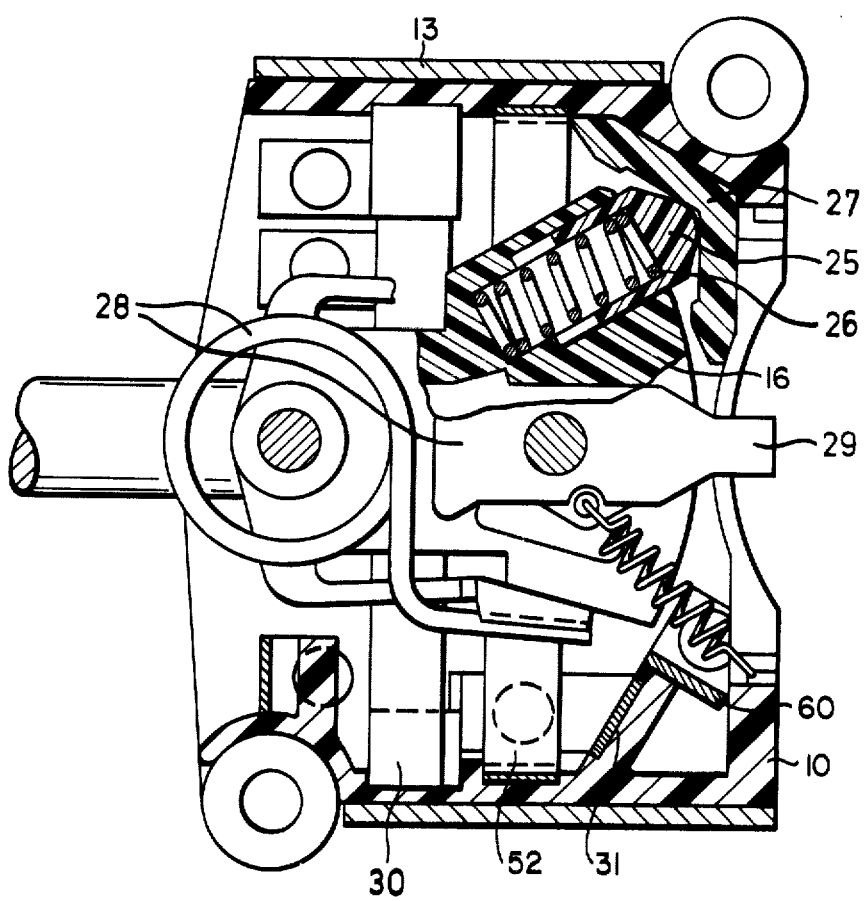
FIG. 3 is a sectional view taken on a line III—III of FIG. 1, parallel to the plane of the base plate.

For retaining switch member 16 in its respective switching positions, a retaining device, shown in FIG. 3, is provided, and comprises a pin 25, a helical spring 26 acting on pin 25 and a locking cam member 27. Pin 25 and helical spring 26 are accommodated in a recess of switch member 16, while locking cam member 27 is mounted on switch body 10. The stops of locking cam 27 make possible the flashing of turn or passing signals when the vehicle is moving along a highway or the like.

To automatically return switch member 16 from either of its two operating positions to its central position, a conventional return device 28, having a return member 29, is provided and is arranged above member 16 as shown in FIGS. 1 and 3. Return member 29 is deflected by a cam, which has not been shown but which is located on the steering column, when the steering wheel returns into the position for straight ahead driving, and thus actuates the return mechanism to cause the return of switch member 16 to its central or neutral position.

Figure 5:
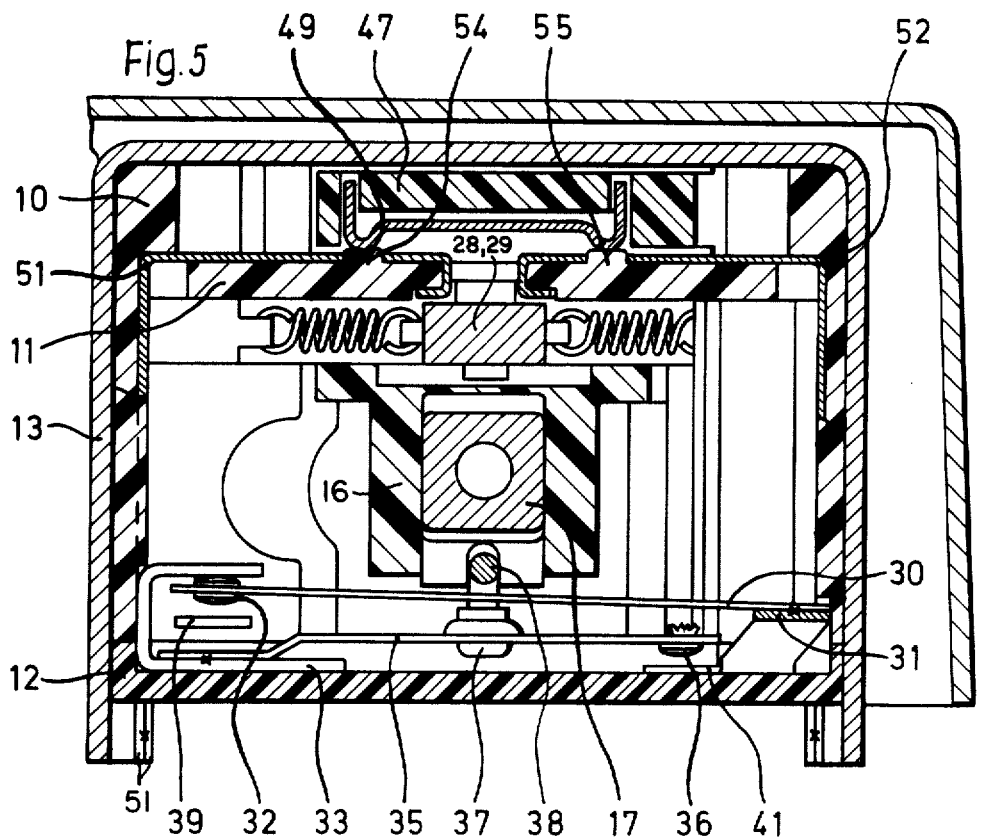
FIG. 5 is a sectional view on the line V—V of FIG. 1, perpendicular to the plane of the base plate.

A set of contacts for selecting between the main or high beam, and the low or dipped beam, and for flashing the headlamps as a courtesy signal, actuated by switch lever 17, is mounted on base plate 12. As best seen in FIG. 5, this set of contacts comprises a leaf spring 30 welded at one end to a contact 31. The free end of leaf spring 30 carries a double contact 32 which normally contacts a connecting stirrup 33 when switch lever 17 is in the main beam position shown in FIG. 5. Connecting stirrup 33 is fixedly connected to a contact pin 34, shown in FIG. 8, and to another leaf spring 35. The free end of leaf spring 35 carries a contact 36, while a button 37, of plastic composition material, is mounted centrally of leaf spring 35.

Figure 4:
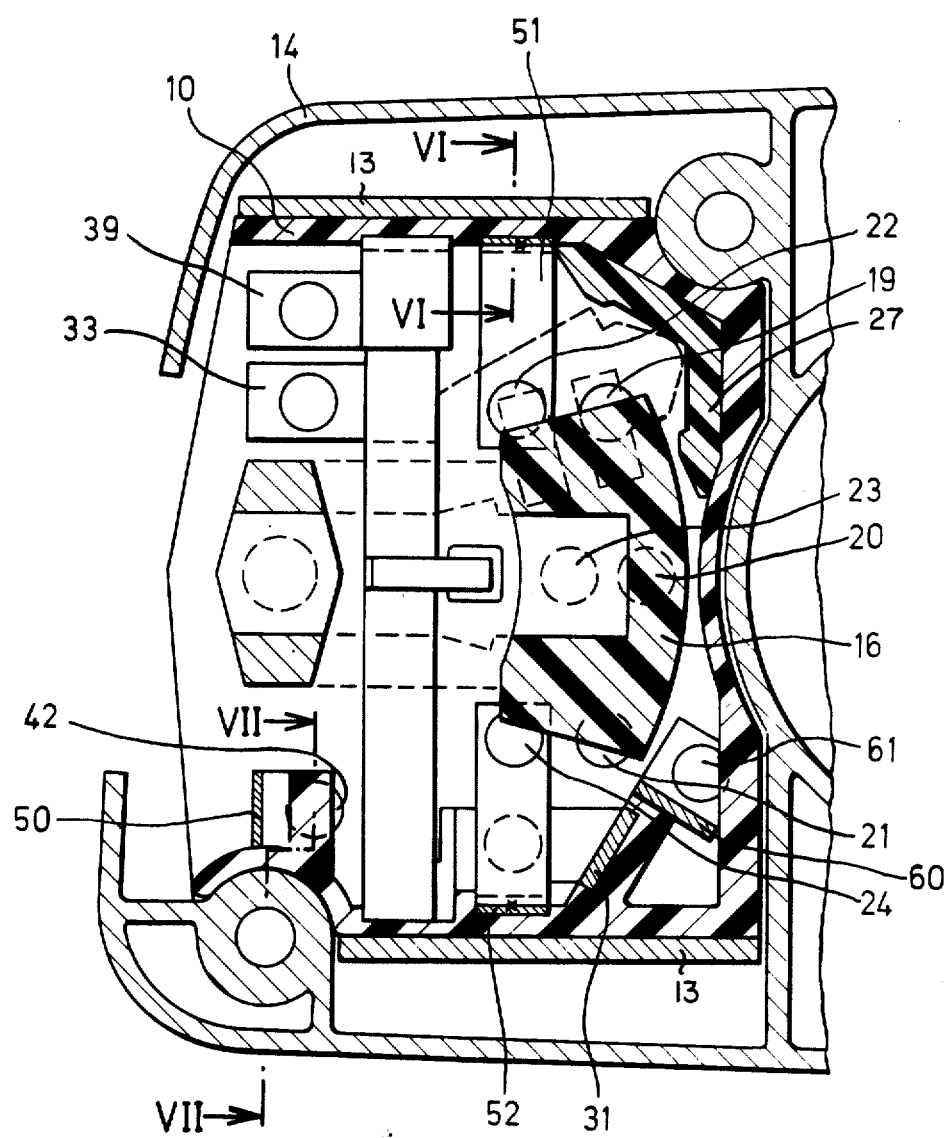
FIG. 4 is a sectional view taken on the line IV—IV of FIG. 1, parallel to the plane of the base plate.

As best seen in FIGS. 1, 4 and 5, an L-shaped switch member 38 is guided for movement perpendicular to the plane of base plate 12, having one leg extending through an aperture in base plate 12. The other leg of switch member 38 is disposed between switch lever 17 and leaf spring 30. If the lever 17 is moved from the main or high beam position, shown in FIG. 5, into the low or dipped beam position, shown in FIG. 1, switch member 38 moves leaf spring 30 into a position such that double contact 32 engages a contact plate 39, shown in FIG. 5, which is electrically connected to a contact plug 40, shown in FIG. 8. If switch lever 17 is further deflected to the position for flashing a courtesy signal, leaf spring 35 is deflected by switch member 38 through leaf spring 30 and button 37, and contact 36 of leaf spring 35 is brought into contact or engagement with the contact plate 41. Thus, this set of contacts performs the function indicated in the lower portion of the circuit diagram of FIG. 10. The leaf springs 30 and 35 are always actuated at the same point, independently of the vertical switching position occupied by switch lever 17 and the position of switch member 16.

Retention of switch lever 17 in its respective switching positions, and automatic return of this switch lever from the position for flashing a courtesy signal, upon release of lever 17, is attained by a retaining device shown in FIG. 1. This retaining device comprises a pin 43, a helical spring 44 acting on pin 43 and a cam surface 45 of switch member 16. Pin 43 and helical spring 44 are accommodated in a recess in the front or inner end of switch lever 17.

A second switch device, which selectively may be mounted in the upper compartment of switch body 10, includes a switch lever 46 whose handle portion is shorter than that of the first switch lever 17 and projects in alignment therewith, and the other end of which switch lever has an engaging member 47 formed integrally therewith. Switch lever 46 is pivotally mounted to rotate on a pin 48 which also forms the pivot pin for member 16 extending through partition or wall 11 of body 10. The end of pin 48 extends through an opening in the cover plate portion of stirrup 13. Thereby, switch lever 46 may be swung or oscillated in a plane parallel to base plate 12.

Figure 2:
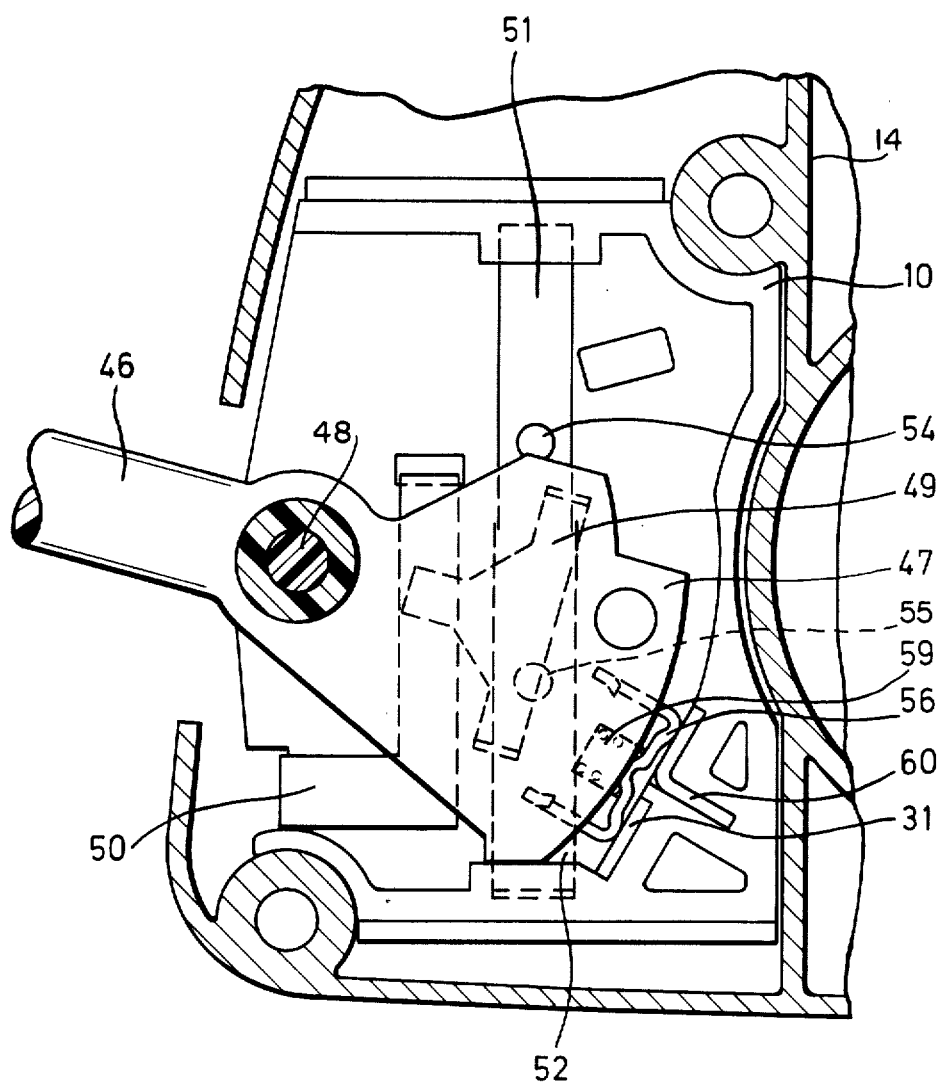
FIG. 2 is a section taken on the line II—II of FIG. 1, parallel to the plane of the base plate.
Figure 6:
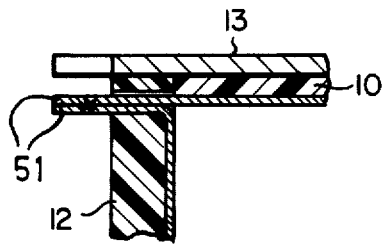
FIG. 6 is a partial sectional view taken on the line VI—VI of FIG. 4.
Figure 7:
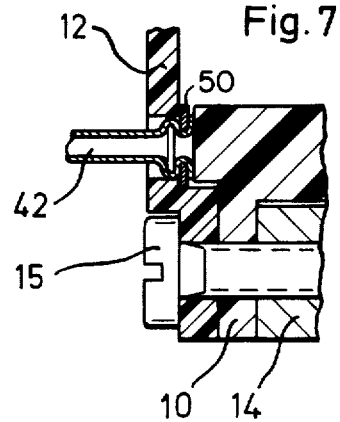
FIG. 7 is a partial sectional view taken on the line VII—VII of FIG. 4.

Member 47 has a recess for receiving and guiding a T-shaped contact bridge 49, shown in FIGS. 1, 2 and 5. The ends of contact bridge 49 are formed as contacts and slide on three counter-contacts 50, 51 and 52 secured to partition or wall 11 and which are formed as contact plates. Bridge 49 is biased into engagement with contact plates 50, 51 and 52 by a helical spring 53. Contact plate 50 is connected to a contact pin 42, contact plate 52 is connected to a contact pin 24, and contact plate 51 is connected to a contact pin 22, these contact pins being shown in FIG. 8. Plastic pegs 54 and 55 formed on wall 11 extend through contact plates 51 and 52. The ends of contact bridge 49, as shown in FIG. 5 rest on these pegs in the central and inoperative position of switch lever 46. In one operating position of switch lever 46, contacts 50 and 51 are interconnected by contact bridge 49 and, in the other operating position, contacts 51 and 52 are interconnected by contact bridge 49. In FIG. 6, it may be seen that contact plate 51 is composed of two parts which are interconnected, as by welding or brazing.

Other recesses are formed on the inner end of member 47 for receiving and guiding another contact bridge 56 which is biased by a helical spring 59 into engagement with two contact plates 31 and 60, in the switching position shown in FIG. 2, to interconnect these two contacts. Contact plate 31 is connected to leaf spring 30, and contact plate 60 is connected to a contact pin or plug 61, both contact plates being mounted in switch body 10. In the other two switching positions of lever 46, contacts 31 and 60 are not connected to each other. Due to the radial arrangement of contact bridge 56, contact plates 31 and 60 need not be bent.

Figure 10:
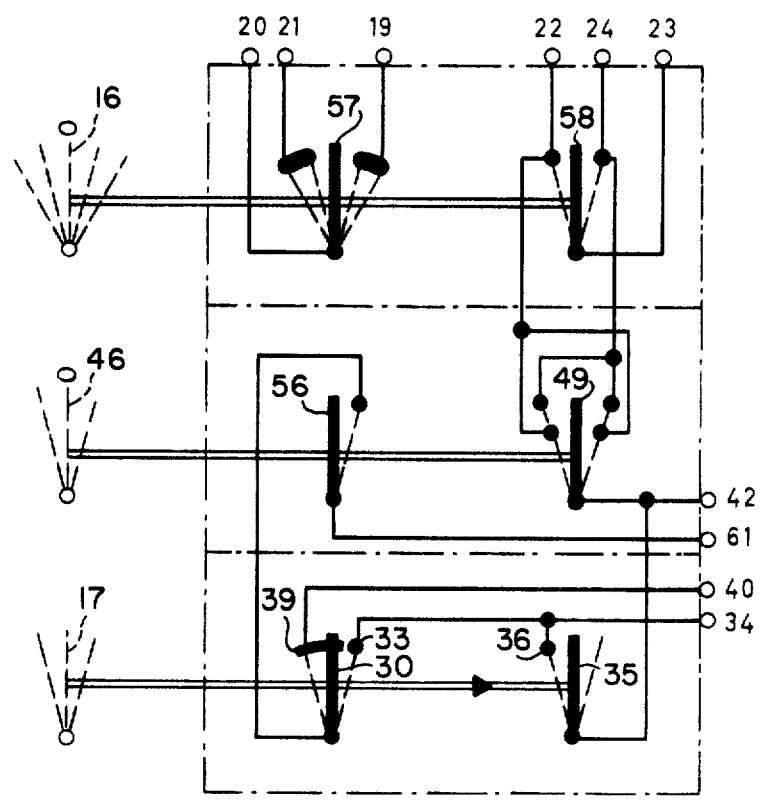
FIG. 10 is a schematic circuit diagram illustrating the electrical connections of the steering column switch.

The functions indicated in the center portion of the circuit of FIG. 10 are performed by contact bridges 49 and 56 and the respective associated contact plates, while the contact bridges 57 and 58 and the respective associated counter-contacts perform the functions indicated in the upper portion of the circuit of FIG. 10.

Switch lever 46 is retained in its respective positions by a retaining device comprising a ball 62, a helical spring 63 acting on ball 62, and openings 64 in the cover portion of sheet metal stirrup 13. Ball 62 and helical spring 63 are mounted in a recess member 47, as best seen in FIG. 1.

Figure 8:
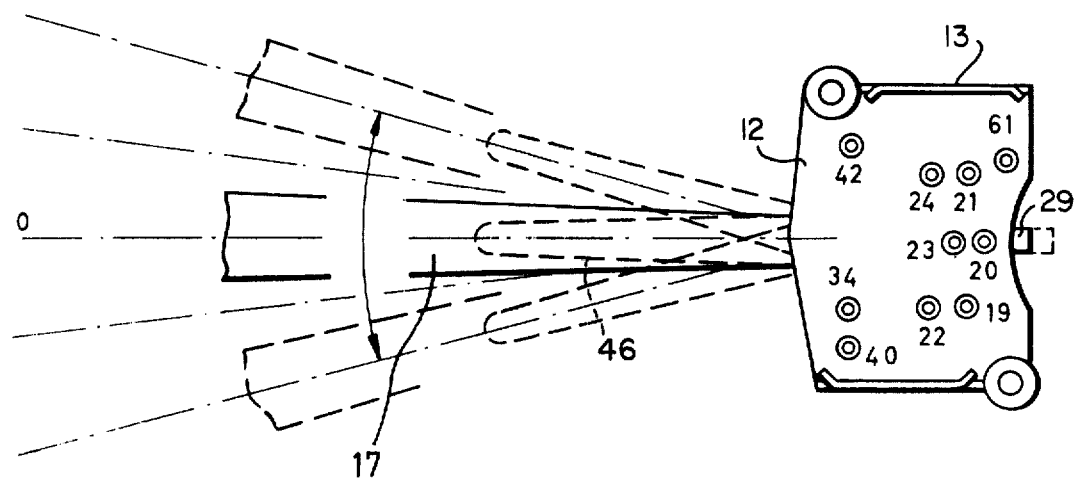
FIG. 8 is a rear or bottom plan view of the steering column switch.
Figure 9:
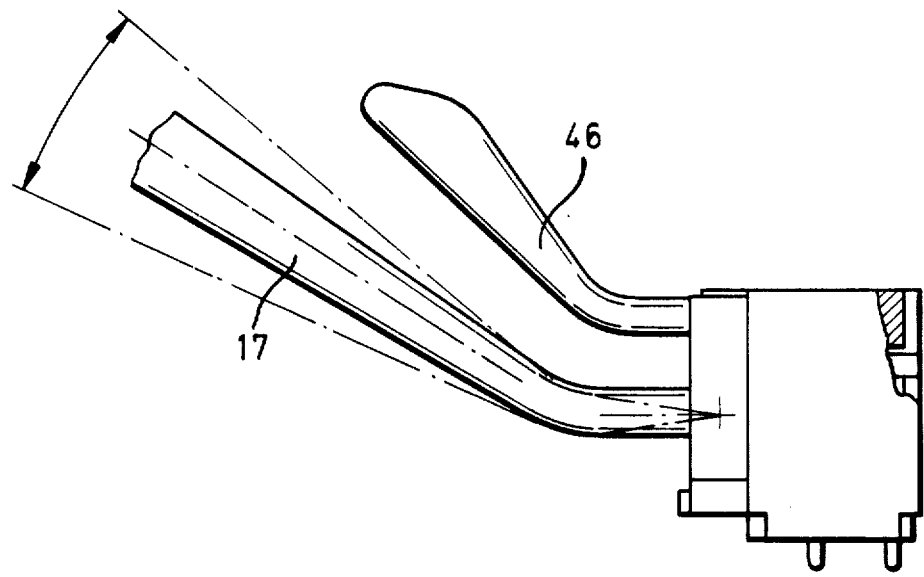
FIG. 9 is a side elevation view, partly broken away, of the steering column switch.

FIGS. 8 and 9 show the switching positions of the switch levers 17 and 46, with FIG. 8 illustrating the contact pins or plugs for connection to the various lamp circuits.

Referring to FIG. 10, contact pin 20 is connected with the flashing indicator, contact pin 21 with the left flashing signal lamps, and contact pin 19 with the right flashing signal lamps. Contact pin 22 is connected to the left parking lamps, contact pin 24 is connected to the right parking lamps, and contact pin 23 is connected to the ungrounded terminal of the battery through a fuse. Contact pins 42 and 61 also are connected to the ungrounded terminal of the battery. The dipped or low beam filaments of the head lamps are connected to contact pin 40, and the main or high beam filaments of the head lamps are connected to contact pin 34. The dipped or low and the main or high beam filaments also can be controlled, in a known manner, by means of relays.

The switch device may be used with only the first switch, having the operating lever 17, mounted therein, or may be used with both the first and second switches mounted therein. When both the first and second switches are mounted in the switching device, they are retained in position by the stirrup-shape cover member 13 which embraces the two switches and also embraces the base 12. If only the first switch is to be mounted on the steering column, a somewhat shorter or shallower cover member 13 is used. When both switches are mounted in the switch device, the first or lower switch is retained in position by the second or upper switch which, in turn, is retained in position by the cover. When only the first or lower switch is mounted in the device, it is retained in position solely by a shallower cover having an opening receiving the pin 48, which pin may be shortened.

While a specific embodiment of the invention has been shown and described in detail to illustrate the application of the principles of the invention, it will be understood that the invention may be embodied otherwise without departing from such principles.

What is claimed is:

1. A steering column switch, for a motor vehicle having a steering column, high beam and low beam headlamps, signal lamps, a flashing indicator, parking lamps, and side lamps, said steering column switch comprising, in combination, a switch mounting means arranged to be secured to said steering column, said mounting means defining a first switch compartment; a first independently constructed switch device constructed and arranged for mounting in said first compartment and including a first switch lever mounted for movement in first and second mutually perpendicular planes, a first switch operable by movement of said first switch lever in said first plane and perpendicular to said second plane to select between high beam, low beam and flashing operation of said headlamps, and a switch operable by movement of said first switch lever in said second plane and perpendicular to said first plane to selectively connect said signal lamps to said flashing indicator and said parking lamps to a vehicle source of electric potential; and cover means cooperable with said mounting means to define a second switch compartment adapted selectively to receive therein a second independently constructed switch device having a respective actuating member and operable to selectively connect said headlamps and said side lamps to the vehicle source of electric potential; said cover means, when said second switch device is mounted in said second compartment, embracing both said switch devices and said mounting means and, in the absence of said second switch device, embracing said first switch device and said mounting means.

2. A steering column switch, as claimed in claim 1, in which said first switch device and said second switch device are arranged in superposition; said actuating member of said second switch device being formed as a second switch lever shorter than said first switch lever and extending in alignment with the latter.

3. A steering column switch, as claimed in claim 1, including connecting plates forming electrical connections between said first switch device and said second switch device, and formed, at least partially, as countercontacts.

4. A steering column switch, as claimed in claim 1, in which said mounting means comprises a switch body of plastic composition material having an H-shaped cross section dividing it into a lower compartment and an upper compartment; said first switch device being mounted in said lower compartment and said second switch device being mounted in said upper compartment; said lower compartment having a base formed by a base plate having contact pins extending therethrough, connected to said first switch device and to said second switch device, and arranged for connection to the lamp circuits.

5. A steering column switch, as claimed in claim 4, said cover means being a stirrup surrounding said switch body and mechanically interconnecting said base plate and said switch body.

6. A steering column switch, as claimed in claim 5, in which said stirrup forms a cover plate for said upper compartment of said switch body.

7. A steering column switch, as claimed in claim 4, in which said first switch device includes a switch member actuated by said first switch lever for movement parallel to said first plane which is parallel to the plane of said base plate; said switch member being formed with respective recesses receiving a first contact bridge connected to said flashing indicator and a second contact bridge connected to the vehicle source of electric potential, for engagement of said first contact bridge with contacts connected to said signal lamps and for engagement of said second contact bridge with contacts connected to said parking lamps; and resilient means biasing each contact bridge into firm engagement with its associated contacts.

8. A steering column switch, as claimed in claim 7, in which said first switch lever is pivotally mounted in said switch member for movement in said second plane which is perpendicular to the plane of said base plate.

9. A steering column switch, as claimed in claim 7, including an L-shaped switch element having one arm extending through an aperture in said base plate perpendicular to the plane of said base plate; and a leaf spring contact forming part of a set of contacts for such selection between high beam, low beam and flashing operation of said head lamps; said L-shaped switch element having a second arm interposed between said first switch lever and said leaf spring contact for operation of said leaf spring contact by movement of said first switch lever in said first plane.

10. A steering column switch, as claimed in claim 9, in which said leaf spring contact is normally engaged with a contact for high beam operation of said head lamps and, upon movement of said first switch lever in said first plane, in one direction, is engaged with a second contact for low beam operation of said head lamps; and further contact means closed by further movement of said first switch lever in said one direction for effecting flashing operation of said head lamps.

11. A steering column switch, as claimed in claim 10, in which said further contact means comprises a second leaf-spring contact fixedly mounted at one end, having a contact at its free end engageable with a fixed contact connected to said first-mentioned leaf-spring contact, and a dielectric button intermediate its ends engageable by said first-mentioned leaf-spring contact upon such further movement of said first switch lever in said one direction.

12. A steering column switch, as claimed in claim 7, in which said switch member of said first switch device is provided with a pin mounting the same for pivotal movement in said second plane; said second switch lever of said second switch device being formed with a switch end forming an engaging member.

13. A steering column switch, as claimed in claim 12, in which said engaging member of said second switch device is formed with a recess receiving a T-shaped resiliently mounted contact bridge having ends formed as contacts; three counter-contacts mounted on the base of said upper compartment and operatively associated with said T-shaped contact bridge; and plastic material pegs extending from the base of said upper compartment through two of said counter-contacts and on which two ends of said T-shaped contact bridge rest in the inoperative position of said second switch device.

14. A steering column switch, as claimed in claim 13, in which said engaging member of said second switch device is formed with further recesses for a further contact bridge effective to bridge two counter-contacts mounted in said switch body in one operative position of said second switch device.

* * * * *